United States Patent
Lundberg et al.

(10) Patent No.: US 7,340,432 B1
(45) Date of Patent: Mar. 4, 2008

(54) SYSTEM AND METHOD FOR SUPPORTING A SECURITY-TRADE FINANCING SERVICE

(75) Inventors: Lance Lundberg, Westport, CT (US); Gijs F. J. Van Thiel, New York, NY (US)

(73) Assignee: ICON International, Inc., Stamford, CT (US)

( * ) Notice: Subject to any disclaimer, the term of this patent is extended or adjusted under 35 U.S.C. 154(b) by 0 days.

(21) Appl. No.: 09/465,506

(22) Filed: Dec. 16, 1999

(51) Int. Cl.
   *G06Q 40/00* (2006.01)

(52) U.S. Cl. .................... 705/38; 705/30; 705/37; 705/35

(58) Field of Classification Search ............ 705/37, 705/35, 38, 30
   See application file for complete search history.

(56) References Cited

U.S. PATENT DOCUMENTS

| | | |
|---|---|---|
| 5,085,435 A | 2/1992 | Rossides |
| 5,269,521 A | 12/1993 | Rossides |
| 5,297,031 A | 3/1994 | Gutterman et al. |
| 5,592,376 A | 1/1997 | Hodroff |
| 5,620,182 A | 4/1997 | Rossides |
| 5,689,650 A * | 11/1997 | McClelland ............. 395/236 |
| 5,732,400 A * | 3/1998 | Mandler et al. ............ 705/26 |
| 5,930,762 A | 7/1999 | Masch |
| 5,970,475 A * | 10/1999 | Barnes ..................... 705/27 |
| 5,974,395 A * | 10/1999 | Bellini ...................... 705/9 |
| 6,167,385 A * | 12/2000 | Hartley-Urquhart ........ 705/35 |
| 6,345,261 B1 * | 2/2002 | Feidelson .................. 705/14 |
| 6,351,738 B1 * | 2/2002 | Clark ....................... 705/37 |
| 2002/0004759 A1 * | 1/2002 | Bradford et al. ............ 705/26 |

* cited by examiner

*Primary Examiner*—Jagdish N Patel
(74) *Attorney, Agent, or Firm*—Kelly Drye & Warren LLP

(57) ABSTRACT

A system and method for supporting a security-trade financing service is disclosed, more particularly, wherein a method is implemented in a computer system containing at least one server including a storage device storing data bases, files, program routines and a communication network, comprising the programmed steps of: maintaining an inventory data base for the security-trade financing of the trading company.

10 Claims, 17 Drawing Sheets

| Media Category<br>Media | Media Inventory | | | |
|---|---|---|---|---|
| | Rate-Card Cost ($)<br>(x $10^3$) | Media Cost ($)<br>(x $10^3$) | Actual<br>Cost Basis (%) | Est.<br>Cost Basis (%) |
| National TV | | | | |
| Natch-1 | $10,000 | $7,760 | 77.6% | |
| Natch-2 | 12,000 | 9,840 | 82.0 | |
| | 22,000 | 17,600 | | 80.0% |
| Local TV | | | | |
| Loch-1 | 5,000 | 3,310 | 66.2 | |
| Loch-2 | 3,000 | 1,890 | 63.0 | |
| | 8,000 | 5,200 | | 65.0 |
| National Cable TV | | | | |
| Natcab-1 | 8,000 | 6,150 | 76.9 | |
| Natcab-2 | 6,000 | 4,350 | 72.5 | |
| | 14,000 | 10,500 | | 75.0 |
| Local Cable TV | | | | |
| Locab-1 | 3,000 | 1,790 | 59.7 | |
| Locab-2 | 1,000 | 550 | 55.0 | |
| | 4,000 | 2,340 | | 58.5 |
| Network Radio | | | | |
| Netrad-1 | 15,000 | 9,555 | 63.7 | |
| Netrad-2 | 13,000 | 8,645 | 66.5 | |
| | 28,000 | 18,200 | | 65.0 |
| Local Radio | | | | |
| Lorad-1 | 10,000 | 4,840 | 48.4 | |
| Lorad-2 | 8,000 | 4,160 | 52.0 | |
| | 18,000 | 9,000 | | 50.0 |
| Outdoor/Out-of-Home | | | | |
| Trucksides | 5,000 | 2,690 | 53.8 | |
| Commuter Rails | 6,000 | 3,240 | 54.0 | |
| Bus Tails | 3,000 | 1,680 | 56.0 | |
| Transit Shelters | 6,000 | 3,390 | 56.5 | 55.0 |
| | 20,000 | 11,000 | | |
| National Publications | | | | |
| Natpubs-1 | 11,000 | 7,990 | 72.6 | |
| Natpubs-2 | 13,000 | 10,010 | 77.0 | |
| | 24,000 | 18,000 | | 75.0 |
| Internet | | | | |
| Insite-1 | 13,000 | 6,760 | 52.0 | |
| Insite-2 | 17,000 | 8,240 | 48.5 | |
| | 30,000 | 15,000 | | 50.0 |

FIG. 5

| Evaluation of a Detailed Media Plan | | | | |
|---|---|---|---|---|
| Media Category<br>Media | Allocation ($)<br>(x $10^3$) | Rate-Card<br>Discount (%) | Actual Plan<br>Cost Basis (%) | Actual Media<br>Cost ($)<br>(x $10^3$) |
| National TV<br>Natch-1 | $1,500 | 5% | 81.7% | $1,225 |
| National Cable TV<br>Natcab-2 | 1,000 | 10 | 80.6 | 806 |
| Local Cable TV<br>Locab-1<br>Locab-2 | 800<br>800 | 10<br>10 | 66.3<br>61.1 | 531<br>489 |
| Outdoor/Out-of-Home<br>Commuter Rails<br>Transit Shelters | 300<br>300 | 15<br>15 | 63.5<br>66.5 | 191<br>199 |
| National Publications<br>Natpubs-2 | 250 | 5 | 81.1 | 202 |
| Internet<br>Insite-1 | 50 | 15 | 61.2 | 31 |
| Total | $5,000 | | 73.5% | $3,674 |

FIG. 6

| Evaluation of a General Media Plan | | | | |
|---|---|---|---|---|
| Media Category | Allocation ($) (x $10^3$) | Rate-Card Discount (%) | Est. Plan Cost Basis (%) | Est. Media Cost ($) (x $10^3$) |
| National TV | $1,500 | 5% | 84.2% | $1,263 |
| National Cable TV | 1,000 | 10 | 83.3 | 833 |
| Local Cable TV | 1,600 | 10 | 65.0 | 1,040 |
| Outdoor/Out-of-Home | 600 | 15 | 64.7 | 388 |
| National Publications | 250 | 5 | 78.9 | 197 |
| Internet | 50 | 15 | 58.8 | 29 |
| Total | $5,000 | | 75.0% | $3,750 |

FIG. 7

| Cash-Credit Ratio ($/Tcr) | Normalized Cash-Credit Ratio ($/Tcr) | Normalized Total Cost ($) | Actual Cost per Trade Credit ($) @ a Total Plan Cost Basis of: | | |
|---|---|---|---|---|---|
| | | | ... 74.9% | 75.0% | 75.1% ... |
| 1/99 | .01/1 | 1.01 | .746 | .748 | .749 |
| 10/90 | .11/1 | 1.11 | .721 | .723 | .724 |
| 20/80 | .25/1 | 1.25 | .686 | .688 | .689 |
| 40/60 | .67/1 | 1.67 | .581 | .583 | .584 |
| 50/50 | 1/1 | 2.00 | .498 | .500 | .502 |
| 60/40 | 1.50/1 | 2.50 | .373 | .375 | .378 |
| 66/33 | 2/1 | 3.00 | .247 | .250 | .253 |

FIG. 8

| Agreed-To Valuation ($)(x 10⁶) | Desired Valuation ($)(x 10⁶) | Total Plan Cost Basis (%) | Desired Plan Cost Basis (%) | Cash-Credit Ratio ($/Tcr) | Investment Value Range Low — High ($)(x 10⁶) | Increment Value ($)(x 10⁶) |
|---|---|---|---|---|---|---|
| $100 | $37.5 | 75% | 37.5% | 60/40 | $2.00 - $4.00 | $.25 |

FIG. 9(a)

| Investment Value ($) (x 10⁶) | Cash Value ($) (x 10⁶) | Trade-Credit Value (Tcr) (x 10⁶) | Total Media Cost ($) (x 10⁶) |
|---|---|---|---|
| $4.00 | $16 | 10.67 Tcr | $26.67 |
| 3.75 | 15 | 10.00 | 25.00 |
| 3.50 | 14 | 9.33 | 23.33 |
| 3.25 | 13 | 8.67 | 21.67 |
| 3.00 | 12 | 8.00 | 20.00 |
| 2.75 | 11 | 7.33 | 18.33 |
| 2.50 | 10 | 6.67 | 16.67 |
| 2.25 | 9 | 6.00 | 15.00 |
| 2.00 | 8 | 5.33 | 13.33 |

FIG. 9(b)

| | | Trade-Credit Values (Tcr) | | | | | | | |
|---|---|---|---|---|---|---|---|---|---|
| | | 9.0 x 10⁶ Tcr | | | 10.0 x 10⁶ Tcr | | | 11.0 x 10⁶ Tcr | | |
| Cash Credit Ratio ($/Tcr) | Actual Cost per Tcr @ 75.0% Total Plan Cost Basis ($) | Cash ($) (x10⁶) | Total Media Cost ($) (x10⁶) | Actual Total Cost @ 75.0% Total Plan Cost Basis ($) (x10⁶) | Cash ($) (x10⁶) | Total Media Cost ($) (x10⁶) | Actual Total Cost @ 75.0% Total Plan Cost Basis ($) (x10⁶) | Cash ($) (x10⁶) | Total Media Cost ($) (x10⁶) | Actual Total Cost @ 75.0% Total Plan Cost Basis ($) (x10⁶) |
| 40/60 | .583 | $6.0 | $15.0 | $5.250 | $6.7 | $16.7 | $5.825 | $7.37 | $18.37 | $6.408 |
| 50/50 | .500 | 9.0 | 18.0 | 4.500 | 10.0 | 20.0 | 5.000 | 11.00 | 22.00 | 5.500 |
| 60/40 | .375 | 13.5 | 22.5 | 3.375 | 15.0 | 25.0 | 3.750 | 16.50 | 27.50 | 4.125 |
| 66/33 | .250 | 18.0 | 27.0 | 2.250 | 20.0 | 30.0 | 2.500 | 22.00 | 33.00 | 2.750 |

FIG. 11

SYSTEM AND METHOD FOR SUPPORTING A SECURITY-TRADE FINANCING SERVICE

BACKGROUND OF THE INVENTION

1. Field of the Invention

The present invention relates generally to a system and method for supporting a security-trade financing service, and more particularly, to a system and method for evaluating data relating to a procurement plan to determine a plan cost basis of certain inventory items and for determining a cash/trade-credit blend based on the plan cost basis and a valuation analysis of a company seeking capital.

2. Background of the Related Art

Barter trading is basically the purchasing of goods and/or services with other goods and/or services (the term goods and/or services are referred to herein as products). It is the oldest form of commerce. With the rise of currency, barter trading eventually became a marginal phenomena.

Today, barter trading has become commonplace again, but now encompasses more than the trading of products. More specifically, barter trading has evolved well beyond its historical definition and now includes trading a combination of products, cash, and trade credits. For this reason, such transactions are identified herein generally as "trading transactions." Furthermore, an entity that supports such transactions is identified herein as a "trading company." Any type of company can be a trading company, as long as it performs the functions as described herein.

Trade credits are any credits that are issued by a trading company which are redeemable by themselves, or in combination with cash, for products as agreed in a trading transaction between a trading company and another company.

A large variety of products are presently traded. Such products include media (e.g., TV, radio, print, and Internet), travel (e.g., air, hotel, and car rental), printing (e.g., offset, gravure, and flexography), accounting services, shipping services, real estate (e.g., office space, storage, and lots), food products, household goods (e.g., stoves, toasters, and lawnmowers), capital goods (e.g., milling and turning machines, television studio equipment, and buildings), legal services, and web design services. The type of product that can be included in a trading transaction is limitless.

A typical trading transaction includes a deficient-asset company, i.e., a seller of deficient products or deficient assets, selling products to a trading company in exchange for trade credits or trade credits in combination with cash. The trade credits, e.g., denominated in dollars, are redeemable for products and can be described generally as worth a dollar of non-cash receivables. The deficient-asset company generally records the sale at the book or fair market value of the assets sold. The trading company will typically dispose of the deficient asset at market value, which is usually substantially lower than the sellers book value. The deficient-asset company's motivation for executing the transaction is in receiving excess market value over the full life of the transaction.

The seller of the asset simultaneously or subsequently pays for various products by redeeming trade credits, or pays for the products partly by paying cash and partly by redeeming trade credits. The combination of cash and trade credits is referred to herein as a cash/trade-credit blend.

Referring to FIG. 1, a block diagram illustrates several examples of trading transactions. Those skilled in the art will appreciate that the examples illustrated and described below are not exhaustive.

Generally, a trading company TC will include a marketing group MG, financial group FG, and an inventory group IG to support a trading transaction. The marketing group MG seeks investment opportunities and promotes business opportunities to corporations seeking to trade products. The financing group FG provides financing expertise to support trading transactions arranged by the marketing group MG. The inventory group IG manages the inventory INV that is purchased and sold through trading transactions. Trading transactions typically include trading various types of products, inventory INV, trade credits Tcr, and a combination of cash $ and trade credits Tcr.

An example of a trading transaction is illustrated in FIG. 1, wherein deficient-asset company DAC-1 is a hotel having a predetermined average number of vacant rooms, i.e., deficient asset DA-1, over a period of time. In order to draw value from the vacant rooms DA-1, the hotel DAC-1 agrees to a trading transaction with the trading company TC to trade the vacant rooms DA-1 for trade credits Tcr. The trade credits Tcr are considered equal to cash, e.g., on a dollar-for-dollar basis, by the trading company TC and may be redeemed at any time in the future for products in the trading company's TC inventory INV. The products in inventory may include media, travel, goods, etc., as described above. After a trading transaction is made, the hotel rooms DA-1 are identified as an inventory item in the trading company's TC books.

Another example of a trading transaction is illustrated in FIG. 1, wherein deficient-asset company DAC-2 is a video equipment manufacturer seeking a customer to purchase their modern video equipment DA-2. Because such equipment can be prohibitively expensive to a customer seeking to purchase such video equipment, trading transactions may be used to offset at least a portion of the cost. More specifically, the trading company TC facilitates the transaction by purchasing the video equipment with a cash/trade-credit blend $/Tcr. After the trading transaction is made, the video equipment DA-2 is identified as an inventory item in the trading company's TC books.

An extension of the trading transaction described immediately above is illustrated in FIG. 1, wherein a deficient-asset company DAC-3 is a news network in need of that same modern video equipment to operate efficiently, however, does not have sufficient cash for its purchase. In order to draw value from anticipated open advertisement slots DA-3, news network DAC-3 agrees to trade the anticipated open advertisement slots DA-3 for the modern video equipment A in the trading company's TC inventory. After the trading transaction is made, the anticipated open advertisement slots DA-3 are identified as an inventory item, and the modern video equipment is removed from the trading company's TC books.

Those skilled in the art will recognize that other similar types of trading transactions may be made, wherein a deficient-asset company DAC-n has an identifiable deficient asset DA-n that it would like to sell. And furthermore, wherein the trading company TC agrees with the deficient-asset company DAC-n to trade the deficient asset DA-n for trade credits Tcr or a cash/trade-credit blend $/Tcr (identified generally as X).

It is notable that the trading company TC benefits in each trading transaction by purchasing the deficient assets DA-n at a significant discount. The deficient-asset companies DAC-n also benefit, as they are not burdened with products that would otherwise have to be liquidated, are wholly or partially perishable, or have low marginal costs.

With continued reference to FIG. 1, illustrated are several examples of trading transactions wherein inventory INV is purchased from the trade company for trade credits Tcr or a cash/trade-credit blend ($/Tcr). In such trading transactions, trade credits are being redeemed for products. Those skilled in the art will appreciate that the examples illustrated and described herein are not exhaustive.

An example of a trading transaction involving the sale of inventory follows. A purchaser company PC-1 is a local news publisher seeking to purchase a modern printing press, however, it does not having sufficient cash to do so. Furthermore, a trading company TC has the modern printing press INV-1 in inventory INV from an earlier trading transaction made with a printing-press manufacturer. The news publisher PC-1 previously sold advertisement space to the trading company TC, therefore, it has accumulated a number of trade credits Tcr. The news publisher PC-1 purchases the desired printing press INV-1 for trade-credits Tcr.

Another example of a trading transaction involving the sale of inventory follows. A purchaser company PC-2 is a cosmetics manufacturer that is seeking to purchase media to promote its goods. The cosmetics manufacturer PC-2 previously sold a deficient asset (e.g., the goods did not meet specifications) to the trading company TC, therefore, it has accumulated a number of trade credits Tcr. Utilizing the trade credits Tcr in combination with cash $ it has available, the cosmetics manufacturer PC-2 is able to purchase a desired media package INV-2 for a cash/trade-credit blend $/Tcr.

Those skilled in the art will recognize other similar types of trading transactions that may be made, wherein a purchasing company PC-n has an identifiable need for products INV-n in the inventory INV of the trading company TC. Furthermore, wherein the trading company TC may make a trading transaction with the purchasing company PC-n to trade the product INV-n for trade credits Tcr, or a cash/trade-credit blend $/Tcr.

Until now, trade transactions have been available primarily to companies that have the capacity to generate and make available deficient assets for trading purposes. Less established companies, for example, start-up companies, have not been able to enjoy the benefits that trading transactions provide. Also, companies requiring capital, but having products that do not readily lend themselves to trading transactions, have not been able to take advantage of the benefits of such transactions.

Oftentimes, such companies find themselves in a catch-22 situation, wherein they require certain resources, for example, capital equipment and media, to promote and grow their business, however, they are unable to obtain the resources or financing therefor until they demonstrate such growth. Of course, this paradoxical situation tends to stifle the growth of a small company and can even lead to its demise.

Companies finding themselves in such situations have a limited number of ways of obtaining needed resources. Among other methods, such companies may seek venture capital funds from outside investors. A disadvantage of this alternative is that the venture capital funds typically have a high cost of capital. In addition, venture capitalists will often value the company at a level that falls significantly below the expectations of the company seeking capital.

From the above, it is understood that a system and method is needed to provide resources to companies that need such resources to grow. In addition, a system and method is needed to facilitate the financing of a company holding few deficient assets, however, have significant growth potential. Furthermore, a system and method is needed that is easy to operate and readily integrated into the various technical systems and business methods presently employed in the marketplace.

SUMMARY OF THE INVENTION

The present invention provides a novel and unique system and method for supporting a security-trade financing service. The system and method addresses deficiencies in the prior art in financing companies seeking resources to facilitate growth.

An embodiment of the method for supporting a security-trade financing service includes the steps of maintaining an inventory data base including data identifying products; determining a cash/trade-credit blend for the purpose of providing financing to the company, wherein the cash/trade-credit blend includes a cash portion and a trade-credit portion; receiving securities from the company in exchange for the trade-credit portion of the cash/trade-credit blend; and receiving at least a portion of the cash/trade-credit blend from the company in exchange for a proportional quantity of the products in inventory that are desired by the company.

The method may further include the steps of receiving deficient assets from a deficient asset company; transferring trade credits to the deficient asset company to pay, at least in part, for the deficient assets; and storing data identifying the deficient assets in the inventory data base. The products identified in the method are selected from the group consisting of goods and services. Furthermore, the cash/trade-credit blend may be represented by a cash-credit ratio. The cash-credit ratio is between 1/99 and 99/1, inclusive.

Another embodiment of the method for supporting security-trade financing for a company seeking capital includes the steps of storing data identifying inventory allocations and inventory components desired by the company; calculating a total plan cost basis based on the inventory allocations and cost bases of the inventory components; calculating a cash-credit ratio based on the total plan cost basis and a desired plan cost basis; calculating one or more cash/trade-credit blends based on the desired plan cost basis, the cash-credit ratio, and one or more investment values; and outputting the one or more cash/trade-credit blends.

The desired plan cost basis may be based on valuations of the company. The valuations may include an agreed-to valuation and a desired valuation. Furthermore, the inventory components may be selected from the group consisting of one or more categories of inventory products and one or more particular inventory products.

The method may further include the step of storing data identifying the one or more categories of inventory products and data identifying the one or more particular inventory products in an inventory data base. The method may further include the steps of storing data identifying an actual cost basis of each of the one or more particular inventory products and storing data identifying an estimated cost basis of each of the one or more categories of inventory products.

The cost bases of the inventory components may be selected from the group consisting of an actual cost bases and an estimated cost bases. Furthermore, the total plan cost basis may be selected from the group consisting of a total actual plan cost basis and a total estimated plan cost basis. The cash-credit ratio may be between 1/99 and 99/1, inclusive.

An embodiment of the system for supporting security-trade financing for a company seeking capital includes a storage device for storing data identifying inventory components and corresponding cost bases; a processor in communication with the storage device, wherein the processor is operative to store data in the storage device identifying inventory allocations and certain inventory components desired by the company, a desired plan cost basis, and one or more investment values. The processor is also operative to calculate a total plan cost basis based on the inventory allocations and the cost bases of the certain inventory components; calculate a cash-credit ratio based on the total plan cost basis and the desired plan cost basis; calculate one or more cash/trade-credit blends based on the desired plan cost basis, the cash-credit ratio, and the one or more investment values; and output the one or more cash/trade-credit blends.

These and other unique features of the system and method disclosed herein will become more readily apparent from the following detailed description taken in conjunction with the drawings.

BRIEF DESCRIPTION OF THE DRAWINGS

So that those of ordinary skill in the art to which the subject invention pertains will more readily understand how to make and use the system and method described herein, preferred embodiments of the invention will be described in detail with reference to the drawings, wherein:

FIG. 5 illustrates media inventory in a trading company's inventory data base;

FIG. 6 illustrates an evaluation of a detailed media plan to determine an actual plan cost basis and an actual media cost to a trading company;

FIG. 7 illustrates an evaluation of a general media plan to determine an estimated plan cost basis and an estimated media cost to a trading company;

FIG. 8 is a table illustrating the actual cost for a trade credit at varying cash/trade-credit ratios and total plan cost bases;

FIGS. 9(a) and 9(b) illustrate an evaluation of entered data to determine cash/trade-credit blends and total media costs related thereto;

FIG. 11 illustrates an evaluation of entered data to determine cash/trade-credit blends and total media costs related thereto;

DETAILED DESCRIPTION OF PREFERRED EMBODIMENTS

Reference is now made to the accompanying Figures for the purpose of describing, in detail, the preferred embodiments of the present invention. The Figures and accompanying detailed description are provided as examples of the invention and are not intended to limit the scope of the claims appended hereto.

The present invention is directed to a data processing system and method for supporting a security-trade financing service. The system and method is intended to facilitate providing an alternate source of financing for a company seeking capital. In addition, the system and method facilitates the financing of a company holding a limited number of deficient assets, however, having significant growth potential. Furthermore, the system and method is relatively easy to integrate into existing technical systems and methodologies presently utilized in the marketplace.

Figure 2A:
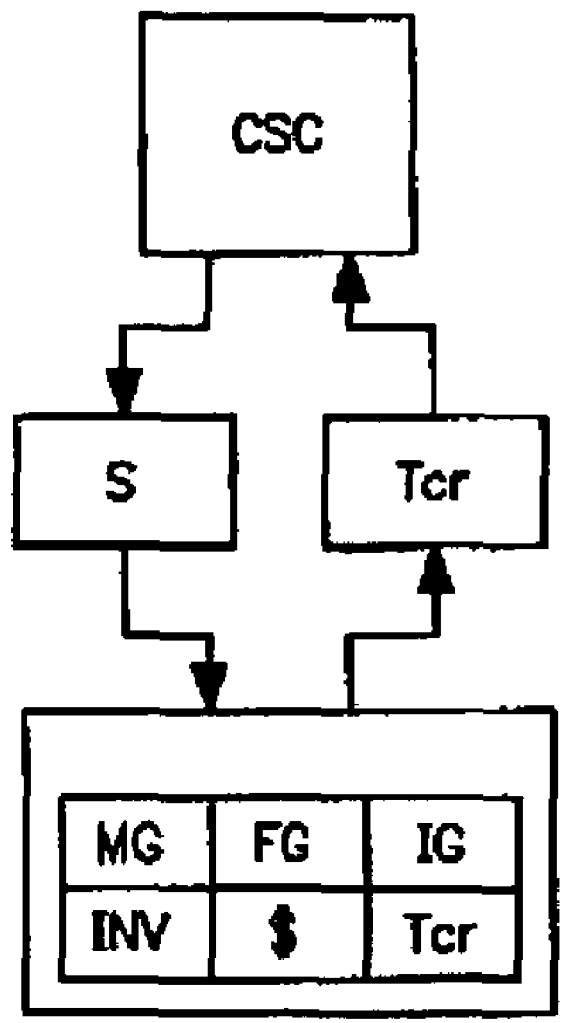
FIGS. 2(a) and 2(b) are block diagrams illustrating a security-trade financing service provided by a trading company TC utilizing a system and method of the present invention.
Figure 2B:
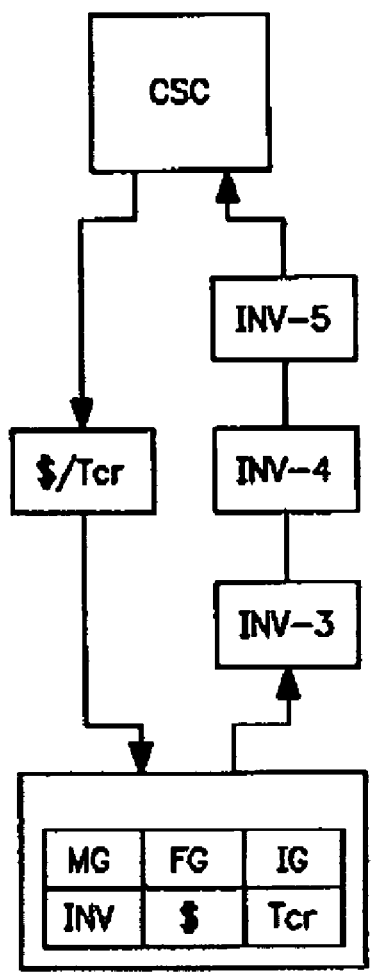

FIGS. 2(a) and 2(b) are block diagrams illustrating a security-trade financing service provided by a trading company TC utilizing a system and method of the present invention. The financing service includes establishing a trading transaction having a first component (FIG. 2(a)) and a second component (FIG. 2(b)).

In FIG. 2(a), a company seeking capital CSC acquires financing from a trading company TC. To obtain financing, the CSC may offer the trading company TC, for example, security S in return for trade credits Tcr. The number of trade credits Tcr that the trading company TC ultimately invests into the CSC depends in part on a valuation of the CSC. For example, the CSC and trading company TC may agree that the trading company TC will invest in 10% of the company based on an agreed-upon company valuation. As part of the agreement, the CSC will agree to purchase products using a cash/trade-credit blend $/Tcr.

In FIG. 2(b), the company seeking capital CSC purchases products INV-3, INV-4, and INV-5 from the trading company TC. The CSC purchases the products with a cash/trade-credit blend $/Tcr until it exhausts its supply of trade credits Tcr. The purchases may be made all at once or over a period of time.

Figure 3:
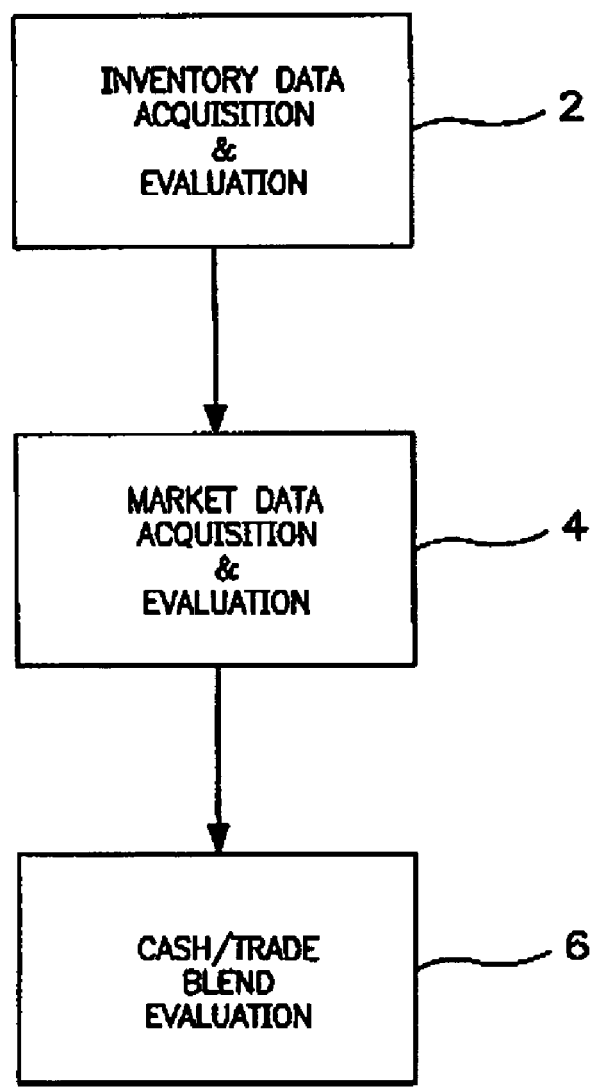
FIG. 3 is a flow chart depicting an embodiment of a method for supporting a security-trade financing service.

Referring to FIG. 3, a flow chart depicts a method for supporting a security-trade financing service. At block 2, a trading company TC produces or acquires products through a series of trading transactions in a manner similar to that described above and illustrated in FIG. 1. As products are acquired, they are associated with pricing data such as a rate-card cost (e.g., face, published, list, or catalogue price) and an actual cost. The pricing data are evaluated to determine an actual cost basis for each product and an estimated cost basis for categorized groups of products.

At block 4, the trading company TC receives from a company seeking capital CSC a plan identifying particular products or categories of products which it desires to purchase. The purchase plan indicates the resources that are to be allocated to each particular product or category of products. The actual or estimated cost basis (determined at block 2) are evaluated to determine a total actual or total estimated plan cost basis for the particular products or categories of products in the purchase plan, respectively.

At block 6, a cash/trade-credit blend is determined. To determine the appropriate blend, a valuation of the company seeking capital CSC is obtained. Those skilled in the art will readily appreciate the various conventional methods for obtaining a valuation. For example, the trading company TC may utilize a public market discounted cash flow model, price-earnings ratio, or a multiplier of revenue model. Alternatively, the trading company TC may obtain a valuation from a third party investor.

After obtaining and evaluating the valuation, the trading company TC and the company seeking capital CSC agree on an amount that the trading company TC will invest into the CSC. Utilizing the agreed-upon investment amount and the total plan cost basis determined at block 4, the trading company TC determines a cash/trade-credit blend that the CSC is willing to pay for products in the trading company's inventory INV. Thereafter, the trading company TC and the CSC make a final agreement on an amount that the trading company TC will invest into the CSC and a cash/trade-credit blend that the CSC will pay for products in the trading company's TC inventory INV. The above method for supporting a security-trade financing service is described in more detail below.

For the description that follows, the term "product" shall include goods and services. Goods and services include media (e.g., TV, radio, print, and Internet), travel (e.g., air, hotel, and car rental), printing (e.g., offset, gravure, and flexography), accounting services, shipping services, real estate (e.g., office space, storage, and lots), food products, household goods (e.g., stoves, toasters, and lawnmowers), capital goods (e.g., milling and turning machines, television studio equipment, and buildings), legal services, and web design services. The above list is not meant to be all inclusive.

The term "deficient asset" shall include products that may be, for example, perishable, distressed, impaired, or having low marginal costs. Basically, deficient assets are products that will incur a significant loss in value over time. The term "deficient-asset company" DAC shall include any company having title to one or more deficient assets.

The term "trading company" TC shall include any company that has title to deficient assets DA and sells them as inventory INV utilizing trade-credits or cash/trade-credit blends as described herein. That is, any company having the basic characteristics of a trading company as described herein is considered to fall within the definition of a "trading company." Of course, those companies that primarily conduct trading activities are considered trading companies. But so may, for example, companies as diverse as airline companies and web design service providers be considered trading companies.

The term "inventory" INV shall include deficient assets DA that were previously purchased and deficient assets DA that have not yet been purchased, but that are generally available in the marketplace from deficient-asset companies DAC. In certain circumstances, e.g., when a deficient asset DA was not previously purchased and not generally available, the term "inventory" may include products that are purchased in the open marketplace (e.g., products that are not deficient). The term "benchmark price" shall include an agreed-upon price for one or more inventory items between a company seeking financing CSC and a trading company TC.

Furthermore, the terms "cash/trade-credit blend," "cash-credit blend," or the like, shall define any combination of cash and trade credits that may be exchanged between a trading company TC and a deficient-asset company DAC, purchasing company PC, company seeking capital CSC, or the like. Cash-credit blends may be represented as cash-credit ratios. Cash-credit ratios may be between 1/99 and 99/1, inclusive. Examples of more typical cash-credit ratios include 80/20, 70/30, and 60/40.

In the description of preferred embodiments, the units "$" and "Tcr" are used to represent "cash" and "trade credits", respectively. Those skilled in the art will recognize that other units may be used without deviating from the scope of the present invention. In addition, the term "security" shall be defined as it is defined in the Securities Act of 1933, 15 U.S.C. §77(b)(1), which is incorporated by reference herein.

The term "rate-card cost" shall refer to the cost of a product based on pricing data provided by groups that monitor prices in the relevant industry. For example, in the media industry, rate-card data for magazine costs are provided by SRDS (Standard Rate and Data Services, Des Plaines, Ill.). The rate-card cost is often the highest cost at which a product may be purchased in the marketplace. The term "market cost" shall refer to the cost of a product based on the natural forces of the marketplace. For example, the market cost of media is typically 0%-20% below the rate-card cost for the same media.

The term "user" or "system user" shall refer to a person that interfaces with the system of the present invention. Typically, system users will directly interface with the system. A system user may interface with the present invention through a stand-alone computer system or over a network of computer systems. As an example, a system user may interface with the system over an intranet using a client/server model. The term "client" shall refer to a computer that includes a processor, storage, display, and an input device. Clients utilize the services of "servers".

In the remainder of the detailed description of preferred embodiments, only media products are referred to in exemplifying the present invention. Those skilled in the art will readily appreciate that other products may be included in a security-trade financing service utilizing the system and method of the present invention.

Figure 4:
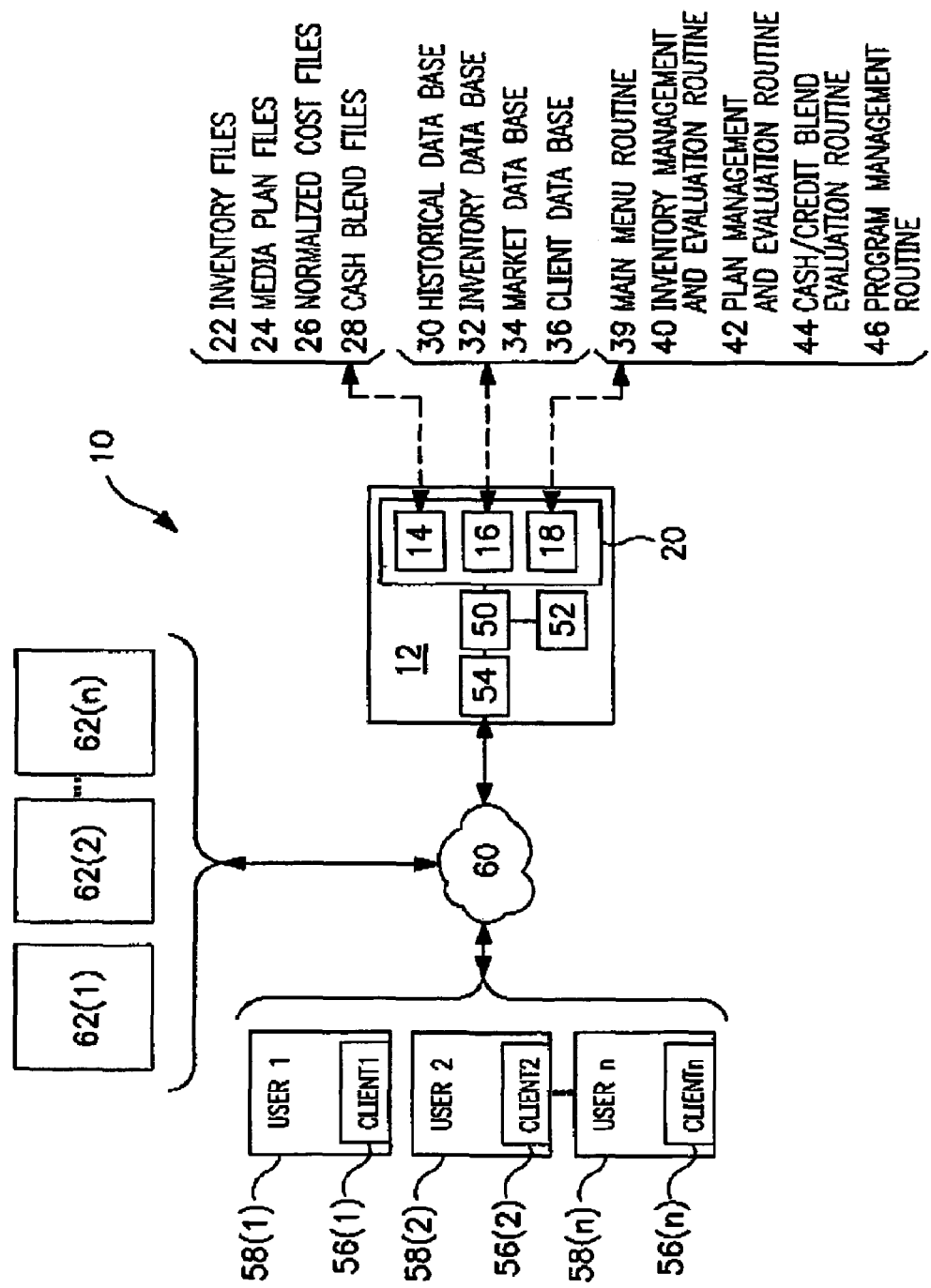
FIG. 4 is a block diagram illustrating an embodiment of a system for supporting a security-trade financing service.

Referring to FIG. 4, a block diagram depicts a computer system 10 for supporting a security-trade financing service. System 10 includes a server 12 having various files 14, data bases 16, and program routines 18 stored in a permanent-type storage device 20.

More specifically, storage device 20 includes inventory files 22, media plan files 24, a normalized cost file 26, and cash blend files 28. In addition, storage device 20 includes a historical data base 30, inventory data base 32, market data base 34, and a client data base 36. Furthermore, storage device 20 includes a main menu routine 39, inventory management and evaluation routine 40, plan management and evaluation routine 42, cash-credit blend evaluation routine 44, and a program management routine 46.

The server 12 is a general-purpose network server that includes a computer processing unit 50 ("CPU") for executing program routines stored in the storage device 20. The server 12 also includes a volatile-type storage device 52 for the temporary storage of data. The server 12 further includes a communication port 54 that enables the CPU 50 to communicate with devices that are external to the server 12. Of course, the system and method of the present invention may be utilized on stand-alone computer device.

Linked to the server 12 are one or more clients 56 operated by users 58. As a more specific example, server 12 is linked to client 56(1) which is operated by user 58(1), linked to client 56(2) which is operated by user 58(2), etc. Clients 56(1)-56(n) are linked to the server 12 through a network 60.

The server 12 may also be linked to specialized market data sources 62(1), 62(2), etc. The data sources 62(1)-62(n) may provide, for example, data for use by the system 10 to determine inventory and market price information.

Those skilled in the art will appreciate that various types of network 60 schemes are available and include, but are not limited to, connection to the Internet via modems and Internet host, direct Internet connections via routers, hardwired point-to-point connections, radio communications, optical communications, and combinations of the aforementioned.

Those skilled in the art will also appreciate that server 12 may alternatively be configured to store data in an external storage device (not shown) or combinations of internal and external storage devices. External storage devices may be local or remote to server 12. In addition, the storage devices of the present invention may be of any type known in the art (e.g., floppy disk, compact disk, tape drive, etc.)

Although the files 14, data bases 16, and routines 18 are illustrated to be stored in a single storage device 20, those skilled in the art will readily appreciate that the data may be stored in disparate storage devices. Unless otherwise specified, references herein to a storage device includes permanent and/or volatile storage.

In addition, those skilled in the art will recognize that although the files 14, data bases 16, and routines 18 are particularly described herein, they may assume other forms, arrangements, and/or configurations and will still be in keeping with the spirit and scope of the present invention.

Referring to FIG. 5, media inventory in a trading company's inventory data base is illustrated. The inventory data base includes various categories of media including National TV, Local TV, National Cable TV, Local Cable TV, Network Radio, Local Radio, Outdoor/Out-of-Home, National Publications, and Internet. Below each category of media are specific media that have been obtained and placed in inventory.

Figure 1:
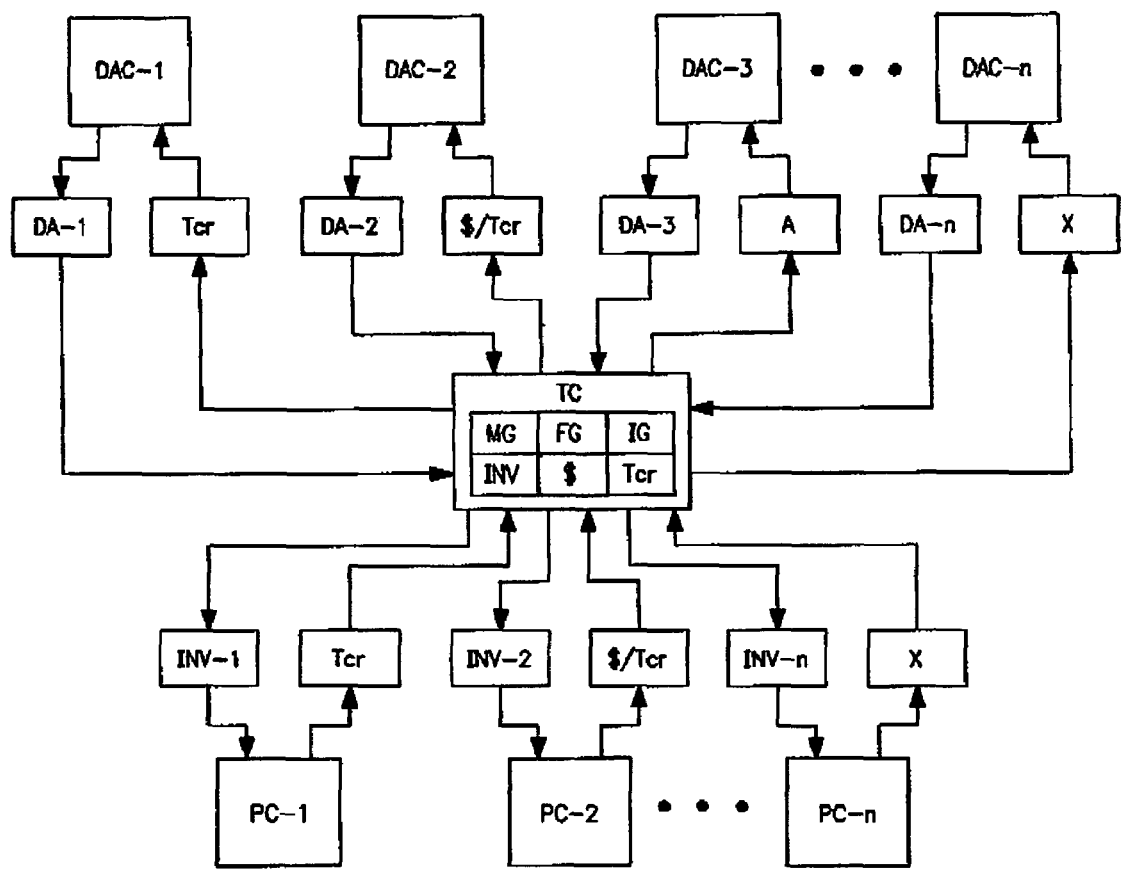
FIG. 1 is a block diagram illustrating trading transactions between deficient-asset companies DAC-n and a trading company TC, and trading transactions between purchasing companies PC-n and the trading company TC.

The media may be obtained, for example, through trading transactions as described herein above and illustrated in FIG. 1. The media include, for example, stations Natch-1 and Natch-2 categorized in the National TV category, and stations Loch-1 and Loch-2 categorized in the Local TV category. Of course, an inventory data base may include more or less media categories and media than what is illustrated in FIG. 5.

Each media is correlated with a rate-card cost of the media that is in inventory, the media cost paid by the trading company TC, the actual cost basis of the media and the estimated cost basis of the media category. For example, station Natch-1 advertisement spots that are in inventory have a rate-card cost of $10,000×10$^3$ and the trading company TC actually paid $7,760×10$^3$ to purchase it, resulting in a cost basis of 77.6% ($7,760/$10,000). As a further example, station Natch-2 advertisement spots that are in inventory have a rate-card cost of $12,000×10$^3$ and the trading company TC actually paid $9,840×10$^3$ to purchase it, resulting in a cost basis of 82.0% ($9,840/$12,000). Of course, the trading company TC may purchase particular media in one trading transaction or several trading transactions.

As noted above, each media category is associated with an estimated cost basis, which is basically the average cost basis for all of the media in a particular media category. For example, the estimated cost basis of all media in the National TV media category is 80.0% ($17,600/$22,000), and the estimated cost basis of all media in the Local TV media category is 65.0% ($5,200/$8,000). The specific use of the above described inventory data is described in more detail herein below.

FIG. 6 illustrates an evaluation of a detailed media plan. The detailed media plan is provided by a company seeking capital CSC to a trading company TC and identifies specific media that the CSC would like to purchase. The evaluation results in a determination of an actual plan cost basis for the detailed media plan. The specific media includes Natch-1, Natcab-2, Locab-1, Locab-2, commuter rails, transit shelters, Natpubs-2, and Insite-1.

An allocation amount from the media plan is associated with each media. In addition, a rate-card discount is associated with each media. The rate-card discount is either an actual discount that a company seeking capital CSC would be given by a media supplier in the open market or an estimated discount as determined by the trading company TC or CSC. It is notable that a CSC may not receive any discount. In other words, the rate-card discount could be zero. Further, a CSC may pay more than rate-card cost due to market conditions. An actual plan cost basis is also associated with each media. The actual plan cost basis incorporates the rate-card discount received by a CSC. Furthermore, an actual media cost is associated with each media.

For example, the media plan illustrated in FIG. 6 includes an allocation for Natch-11 of $1,500×10$^3$. Further, Natch-1 includes a rate-card discount of 5%. The actual cost basis for Natch-1 to the trading company TC is 77.6% (FIG. 5). Therefore, the actual media cost of Natch-1 to the trading company TC is $1,225×10$^3$ (($1,500×10$^3$/0.95)×0.776) and the actual plan cost basis is 81.7% ($1,225/$1,500). A total actual plan cost basis is determined for each evaluation of a detailed media plan. The total actual plan cost basis for the illustrated evaluation is 73.5% ($3,674/$5,000).

FIG. 7 illustrates an evaluation of a general media plan. The general media plan is provided by a company seeking capital CSC to a trading company TC and identifies media categories desired by the CSC. Such a general media plan may be provided instead of a detailed media plan when the CSC is uncertain of the exact media that it desires to purchase. The media categories include National TV, National Cable TV, Local Cable TV, Outdoor/Out-of-Home, National Publications, and Internet.

An allocation amount from the media plan is associated with each media category. In addition, a rate-card discount is associated with each media category. Further, an estimated plan cost basis is associated with each media category. The estimated plan cost basis incorporates the rate-card discount received by the CSC. Furthermore, an estimated media cost is associated with each media category.

For example, the media plan illustrated in FIG. 7 includes an allocation for National TV of $1,500×10$^3$. Further, the media of National TV includes a rate-card discount of 5%. The estimated cost basis for National TV to the trading company TC is 80.0% (FIG. 5). Therefore, the estimated media cost of the media category National TV to the trading company is $1,263×10$^3$ (($1,500×10$^3$/0.95)×0.80) and the estimated plan cost basis is 84.2% ($1,263/$1,500). A total estimated plan cost basis is determined for each evaluation of a general media plan. The total estimated plan cost basis for the illustrated evaluation is 75.0% ($3,750/$5,000).

It is notable that even though the evaluation illustrated in FIG. 7 is based on the cost of general categories of media, the results deviate from that of the evaluation illustrated in FIG. 6, which is based on the cost of specific media, by only one-and-one-half percentage points (73.5% vs. 75.0%). This enables the trading company TC to be relatively flexible in its negotiations with the company seeking capital CSC even with estimated cost basis data (FIG. 5). In other words, the trading company TC does not significantly increase its cost basis by permitting the CSC to provide a general media plan as opposed to a detailed media plan.

Those skilled in the art will readily appreciate that media plans other then those illustrated in FIGS. 6 and 7 may be developed that are in keeping with the scope of the present invention. For example, if a media plan includes an inventory item that must be purchased on the open market, the trading company TC may pay less than rate-card cost, rate-card cost, or greater than rate-card cost. The plan cost basis, media cost, and total plan cost basis is determined in a manner similar to that described above. Furthermore, a media plan may include both categories of media and specific media.

Referring to FIG. 8, a table illustrates the actual cost for a trade credit at varying cash-credit ratios and total plan cost bases. Data from the table basically indicates the cost of each trade credit to a trading company TC based on a particular total plan basis and cash-credit ratio. For example, a cash-credit ratio of 66/33 $/Tcr has a normalized cash-credit ratio of 2/1 $/Tcr. Consequentially, the normalized total cost is $3.00. If, for example, an evaluation of a media plan results in a total estimated plan cost basis of 75.0% (FIG. 7), and a 66/33 $/Tcr cash-credit ratio is chosen, then the actual cost to the trading company TC per trade credit is $0.250 (($3.00×0.750)−$2). FIG. 8 illustrates the actual cost per trade credit for common cash-credit ratios, however, the actual cost per trade credit for any cash-credit ratio (e.g., 5/95, 15/85, etc.) can be determined. Furthermore, it is anticipated that a trading company TC may consider cash-credit ratios ranging from 1/99 to 99/1.

Referring to FIGS. 9(a) and 9(b), tables illustrate an evaluation of data entered by a user to determine cash/trade-credit blends and total media costs related thereto. The tables may be used to facilitate the system and method of a security-trade financing service of the present invention.

Referring to FIG. 9(a), after agreeing with a company seeking capital CSC that it has a particular valuation and after an evaluation of a media plan for the CSC (as described above), a trading company TC determines a desired valuation based on experience and sound business reasoning. More specifically, and by way of example, a system user for the trading company TC enters the agreed-to valuation of $100×10$^6$ and the desired evaluation of $37.5×10$^6$ into a system embodying the present invention. The total plan cost basis is carried over from the evaluation of the media plan. For example, the total estimated plan cost basis of 75.0% is carried over from the evaluation of a general media plan (FIG. 7).

Based on the agreed-to valuation and the desired valuation, a desired plan cost basis of 37.5% ($37.5×10$^6$/$100×10$^6$) is automatically calculated. It is notable that the desired plan cost basis is equivalent to the actual cost per trade credit, i.e., $0.375. Furthermore, the cash-credit ratio of 60/40, corresponding to the desired plan cost basis of 37.5%, is carried over from the table illustrated in FIG. 8. If the desired plan cost basis is not found in the table (FIG. 8), then the system may, for example, automatically interpolate between two known values or choose a next higher or next lower value and provide the corresponding cash-credit ratio.

Thereafter, the user selects an investment range of, for example, $2×10$^6$ to $4×10$^6$, and an increment value of $0.25×10$^6$. The increment value is used by the system to increment from the low investment-range value to the high investment-range value, as described below. The user then enters the entered data.

Referring to FIG. 9(b), the system evaluates the entered data to determine a cash/trade-credit blend and a total media cost for each incremental value. More specifically, for example, the investment value of $4.00×10$^6$ results in a trade-credit value of 10.67×10$^6$ Tcr ($4×10$^6$/0.375), a cash value of $16×10$^6$ (10.67×10$^6$×(60/40)), and a total media cost of $26.67×10$^6$ (10.67×10$^6$ Tcr+$16×10$^6$).

Figure 10B:
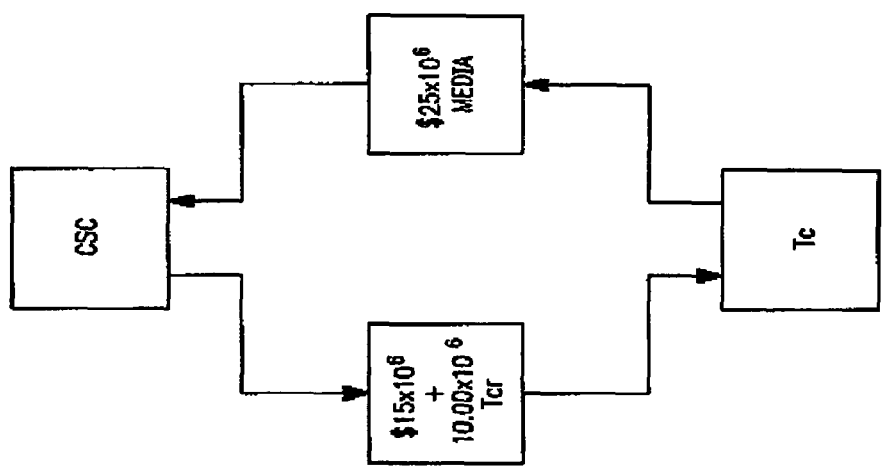
FIGS. 10(a) and 10(b) are block diagrams similar to FIGS. 2(a) and 2(b) illustrating a security-trade financing transaction based on the evaluation illustrated in FIGS. 9(a) and 9(b)
Figure 10A:
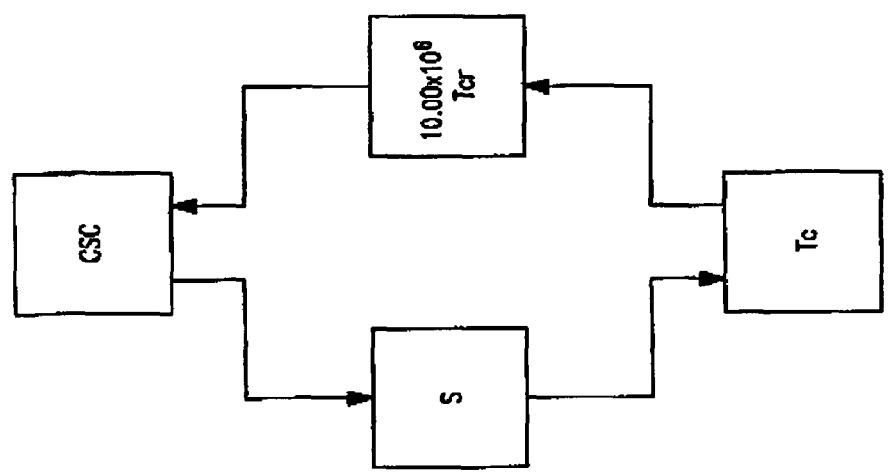

Referring to FIGS. 10(a) and 10(b), block diagrams similar to FIGS. 2(a) and 2(b), respectively, illustrate a security-trade financing transaction based on the evaluation described above and illustrated in FIGS. 9(a) and 9(b). More specifically, assuming the investment value of $3.75×10$^6$ was deemed acceptable to the user, a trading transaction deal is made with the company seeking capital CSC, wherein the CSC agrees to provide the trading company TC security S in return for 10.00×10$^6$ Tcr (FIG. 10(a)). And furthermore, wherein the CSC agrees to purchase $25.00×10$^6$ worth of media at a cash-credit ratio of 60/40 $/Tcr (FIG. 10(b)).

The purchase of media by the company seeking capital CSC at a cash-credit ratio of 60/40 $/Tcr results in a total cash expenditure of $15×10$^6$ and a total trade-credit expenditure of 10.00×10$^6$ Tcr. Of course, the purchase of media by the CSC may occur over a plurality of transactions and over a period of time as agreed between the CSC and the trading company TC. Those skilled in the art will recognize the significant advantage of such a system when a transaction must be turned over quickly and/or when a plurality of security-trade financing transactions are in progress simultaneously.

Referring to FIG. 11, a table illustrates another embodiment of the present invention, wherein data entered by a user is evaluated to determine a cash-credit blend, total media cost, and an actual total cost. A trading company TC initially determines a total actual or total estimated plan cost basis as described above and illustrated in FIGS. 5-7. The trading company TC then enters a range of cash-credit ratios $/Tcr and a range of trade-credits Tcr which it desires to invest. The system evaluates the entered data and provides the cash portion of the cash-credit blend, total media cost, and actual total cost.

More specifically, and by way of example, the trading company TC may determine a total estimated plan cost basis of 75.0% as described above and illustrated in FIG. 7. Thereafter, a system user for the trading company TC enters into the table of FIG. 11 a range of cash-credit ratios $/Tcr (i.e., 40/60, 50/50, 60/40, and 66/33) and a range of trade-credit values Tcr (i.e., 9.0×10$^6$ Tcr, 10.0×10$^6$ Tcr, and 11.0×10$^6$ Tcr.)

The total estimated plan cost basis of 75.0% is carried over from the evaluation of the media plan (FIG. 7). Furthermore, each actual cost per trade credit Tcr (i.e., $0.583, $0.500, $0.375, and $0.250), corresponding to the total estimated plan cost basis of 75.0%, is carried over from the table of FIG. 8 and correlated with their respective cash-credit ratios $/Tcr.

After the above values have been entered, the system evaluates the data and determines a cash portion of the cash-credit blend, total media cost, and an actual total cost of the media plan to the trading company TC.

For example, in evaluating a 60/40 cash-credit ratio $/Tcr, the cash portion of the cash-credit blend having $10.0 \times 10^6$ Tcr is determined to be $\$15.0 \times 10^6$ ($10.0 \times 10^6$ Tcr$\times 60/40$), the total media cost is determined to be $\$25.0 \times 10^6$ ($\$15.0 \times 10^6$ + $10.0 \times 10^6$ Tcr), and the actual total cost to the trading company TC is determined to be $\$3.750 \times 10^6$ ((($\$25.0 \times 10^6$)$\times$ $0.750$)$-\$15.0 \times 10^6$). It is notable that the term "actual total cost" in the table in FIG. 11 is synonymous with the term "investment value" in the table in FIG. 9(b).

Those skilled in the art will recognize the significant advantage of such an alternate embodiment of the system when a transaction must be turned over quickly and/or when a plurality of security-trade financing transactions are in progress simultaneously.

Figure 12:
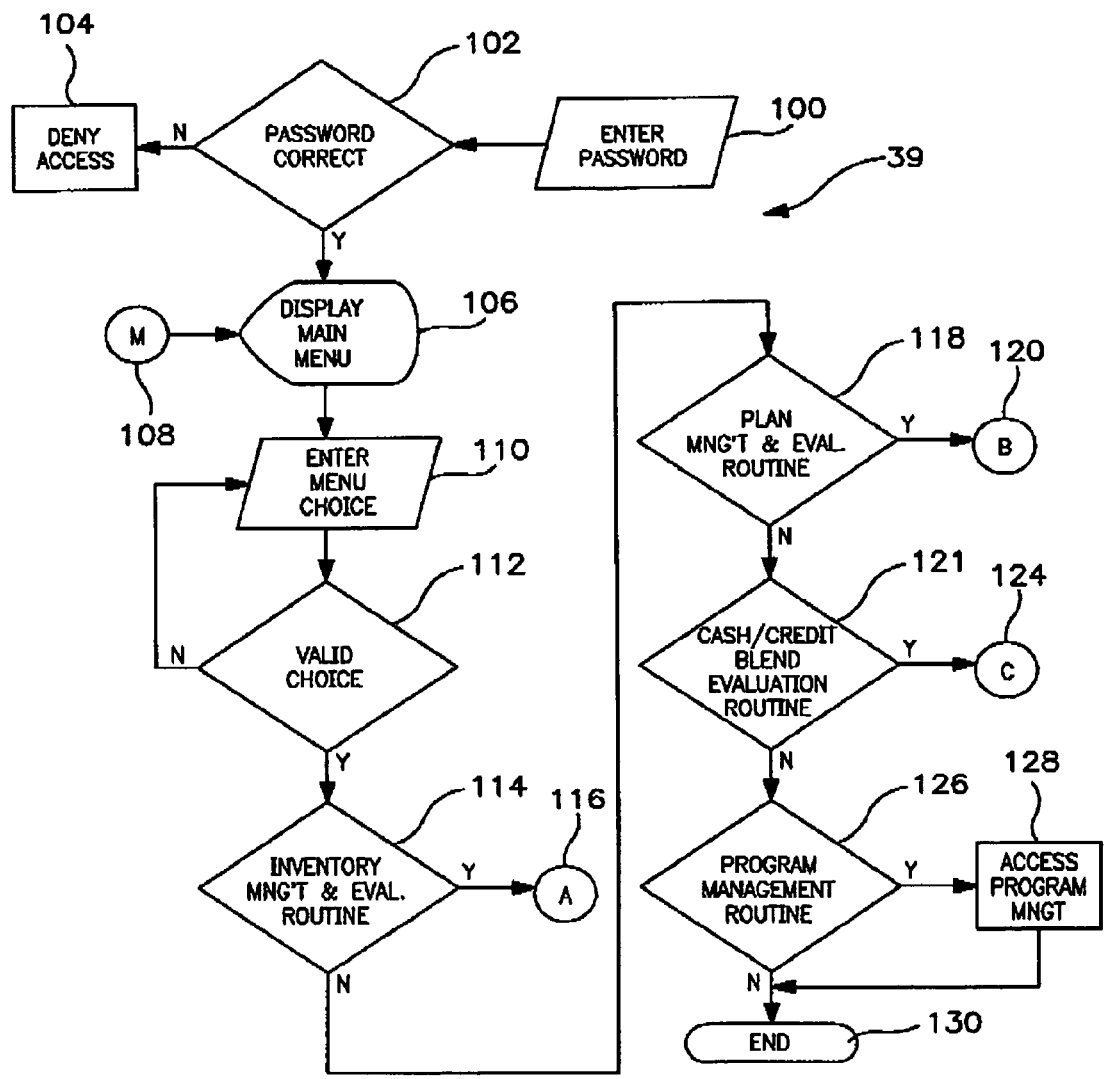
FIG. 12 is a flow chart of a software routine for a main menu used in a data processing system of the present invention.

Referring to FIG. 12, a flow chart illustrates a main menu routine 39 of a data processing system made in accordance with an embodiment of the present invention. The system starts at block 100, wherein a user enters a password for obtaining access to routine 39. If, at block 102, the user's password is not accepted, then access to the system is denied at block 104. If, at block 102, the user's password is accepted, then, at block 106, a main menu is displayed on a display. The display may be a CRT of a client 56 that is in communication with the server 12 (FIG. 4). Entry point M as shown in block 108 is provided to allow other routines to return to the main menu routine 39.

At block 110, the user is prompted to enter a menu choice. If, at block 112, the menu choice is determined to be invalid, an error message is displayed, the routine returns to step 110, and the user is again prompted to enter a menu choice. If, at block 112, it is determined that the menu choice is valid, then the routine 39 proceeds to block 114.

At block 114, the routine 39 determines whether the inventory management and evaluation routine 40 was selected. If routine 40 was selected, the system proceeds to routine 40 via entry point A, as shown in block 116. If routine 40 was not selected, the system proceeds to block 118. At block 118, the system determines whether the plan management and evaluation routine 42 was selected by the user. If routine 42 was selected, the system proceeds to routine 42 via entry point B, as shown in block 120. If routine 42 was not selected, the system proceeds to block 122.

At block 122, the system determines whether the cash-credit blend evaluation routine 44 was selected by the user. If routine 44 was selected, the system proceeds to routine 44 via entry point C, as shown in block 124. If routine 44 was not selected, the system proceeds to block 126. At block 126, the system determines whether the program management routine 46 was selected by the user. If routine 46 was selected, the system proceeds to routine 46, as shown in block 128.

After the user completes program management activities in block 128, the system proceeds to block 130 and the system ends operation. If routine 46 was not selected, then the user selected the choice to exit from the main menu and the system ends operation at block 130.

Figure 13:
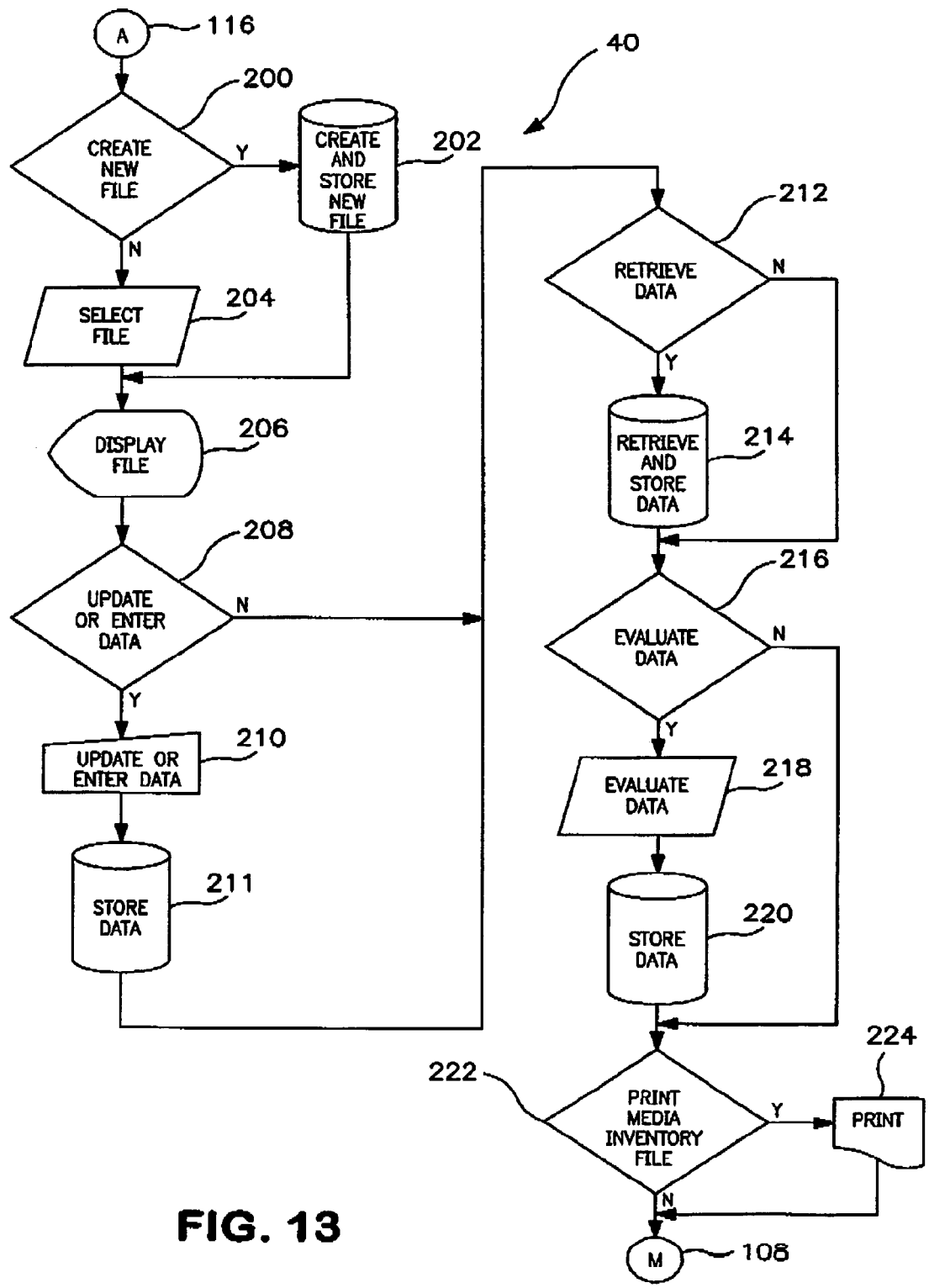
FIG. 13 is a flow chart of a software routine for inventory management and evaluation in a data processing system of the present invention.

Referring to FIG. 13, a flow chart illustrates an inventory management and evaluation routine 40 of a data processing system made in accordance with an embodiment of the present invention. The routine 40 provides for creation, modification, and evaluation of an inventory file.

At block 116 (entry point A), the user enters routine 40 from main menu routine 39 and proceeds to block 200. At block 200, the user is prompted as to whether a new inventory file is to be created. If a new inventory file is to be created, the system proceeds to block 202, wherein the user enters information identifying a new inventory file, enters inventory items, and stores the file. Thereafter, the user proceeds to block 206. At block 206, the inventory file created at block 202 is displayed to the user and the system proceeds to block 208.

The inventory file may be a template utilized as a guide to document specifications, costs, and cost bases of particular categories and types of media inventory. The data identifying the inventory may ultimately be stored in the inventory database 32 (FIG. 4). The media inventory file illustrated in FIG. 5 is an example of an inventory file that may be created with the data processing system of the present invention.

If, at block 200, a new inventory file is not to be created, the system proceeds to block 204. At block 204, the user is prompted to select an inventory file from storage. After an inventory file has been selected, the system proceeds to block 206. At block 206, the inventory file selected at block 204 is displayed to the user and the system proceeds to block 208.

At block 208, the user is queried as to whether data is to be updated or new data is to be entered into the inventory file. If so, the system proceeds to block 210 and the user updates data or enters new data into the inventory file. Thereafter, the system proceeds to block 211 where the inventory file is stored in storage. The system then proceeds to block 212. If, at block 208, the user decides not to update or enter new data, the system proceeds directly to block 212.

At block 212, the user is queried as to whether data is to be retrieved and stored, for example, from a data source 62 which is accessible through the Internet (FIG. 4). If the user decides to retrieve data, the system proceeds to block 214 where the data source 62 is selected, and data is downloaded and stored in storage. Such data may include the latest rate-card costs from media providers or from groups that monitor prices in the relevant industry. Thereafter, the system proceeds to block 216. If, at block 212, the user decides data is not to be retrieved and stored, the system proceeds directly to block 216.

At block 216, the user is queried as to whether the actual and estimated cost bases are to be evaluated. If the user decides to have the actual and estimated cost bases evaluated, the system proceeds to block 218 and the actual cost basis for each media in the inventory file is evaluated and the estimated cost basis for each media category in the inventory file is evaluated. Thereafter, the system proceeds to block 220 where the inventory file is stored in storage. After the inventory file is stored in storage, the system proceeds to block 222. If, at block 216, the user decides the actual and estimated cost bases are not to be evaluated, then the system proceeds directly to block 222.

At block 222, the user is queried as to whether the media inventory file is to be printed. If the media inventory file is to be printed, the system proceeds to block 224 and the media inventory file is printed for review by the user. Thereafter, the system proceeds to the main menu via block 108 (entry point M). If, at block 222, the media inventory file is not to be printed, the system proceeds directly to the main menu via block 108 (entry point M).

Figure 14:
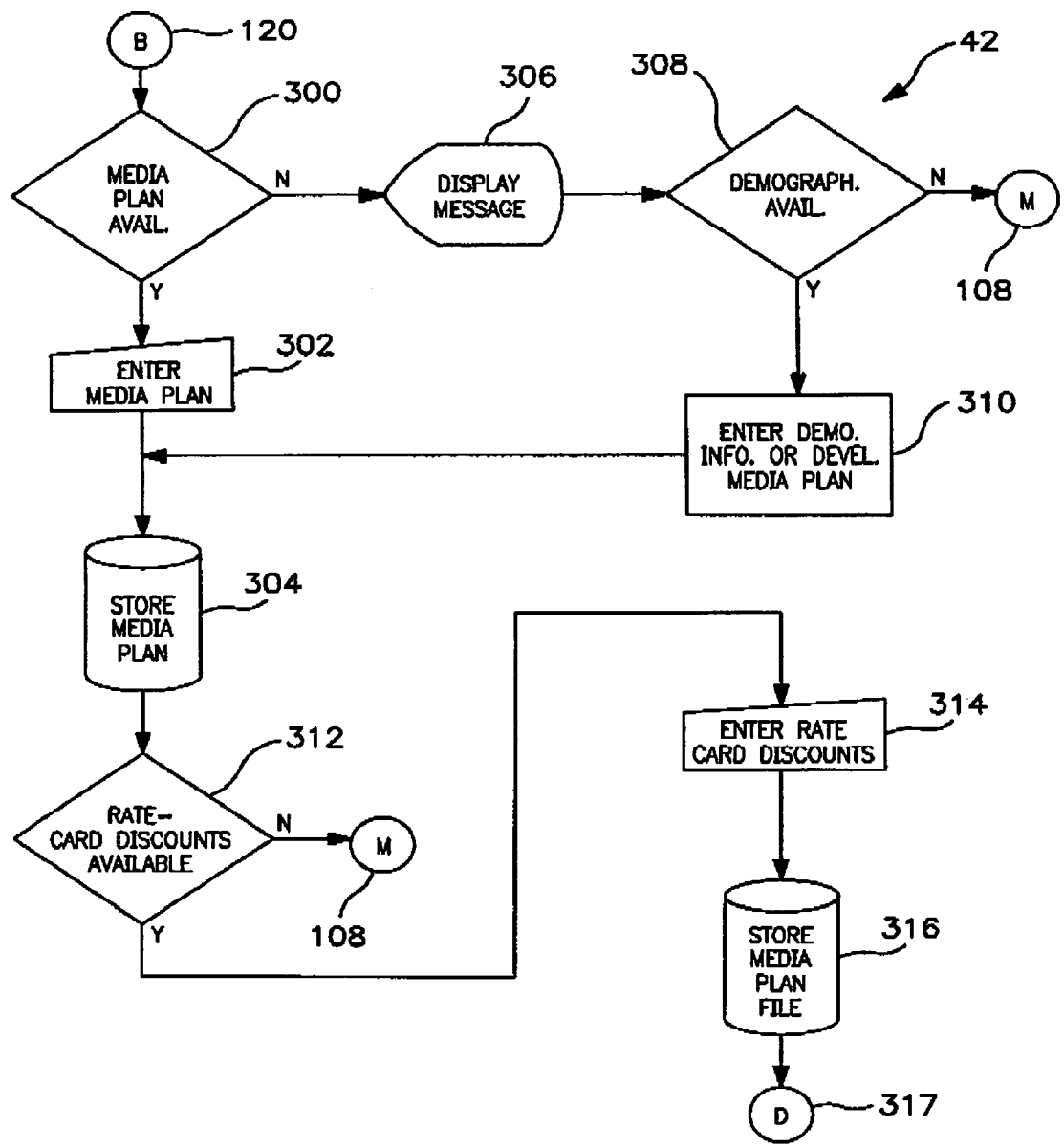
FIG. 14 is a flow chart of a software routine for plan management and evaluation in a data processing system of the present invention.

Referring to FIG. 14, a flow chart illustrates a plan management and evaluation routine 42 of a data processing system made in accordance with an embodiment of the present invention. Subroutine 42 provides for the creation, modification, and evaluation of, for example, a detailed media plan file and a general media plan file.

At block 120 (entry point B), the user enters routine 42 from main menu routine 39 and proceeds to block 300. At block 300, the user is prompted as to whether a media plan from a company seeking capital CSC is available. If a media plan is available, the system proceeds to block 302, wherein the user creates a media plan file and enters information from the CSC's media plan including, for example, the identity of the CSC, particular media desired by the CSC, and monetary amounts that are to be allocated for each particular media. The media plan file illustrated in FIG. 6 includes a detailed media plan, wherein particular media are identified. More specifically, the particular media entities Natch-1, Natcab-2, Locab-1, Locab-2, Commuter Rails, Transit Shelters, Natpubs-2, and Insite-1 are identified.

If the media plan does not identify the particular media desired by the company seeking capital CSC, then the user may alternatively enter, for example, categories of media and the monetary amounts that are to be allocated for each media category. The media plan file illustrated in FIG. 7 includes a general media plan, wherein media categories are identified. More specifically, the media categories National TV, National Cable TV, Local Cable TV, Outdoor/Out-Of-Home, National Publications, and Internet are identified.

After a particular or general media plan is entered into the media plan file, the system proceeds to block 304 where the media plan file is stored in storage.

If, at block 300, a media plan is not available, the system proceeds to block 306, wherein a message is displayed querying the user for demographic information (e.g., age, gender, and geographic region) identified by the company seeking capital CSC. If, at block 308, it is determined that demographic information is unavailable, then the system proceeds to the block 108 (entry point M) and returns to the main menu routine 39. If, at block 308, demographic information is available, the system proceeds to block 310.

At block 310, the user enters the demographic information identified by the company seeking capital CSC. Thereafter, the system automatically develops a detailed or general media plan utilizing the market data base 34 (FIG. 4). The market data base 34 identifies and demographically categorizes media in all significant markets.

Alternatively, at block 310, the user develops a media plan based on the demographic information, inventory data stored in the inventory data base 32, and historical data stored in the historical data base 30. The historical data base 30 is a convenient tool used for generating media plans in that it includes media plans, e.g., legacy data, of companies that are similarly situated to the CSC.

After a media plan is developed by the user, it is entered into the system. The user then identifies the monetary amount that will be allocated for each particular media or category of media, as the case may be, in the media plan. Thereafter, the system proceeds to block 304 where the media plan file is stored in storage.

At block 312, the user is queried as to whether rate-card discounts are available. As described above and illustrated in FIGS. 6 and 7, rate-card discounts may be applied against each media or media category allocation. If rate-card discounts are available or it is determined that they are not available and need not be applied to particular media, then the system proceeds to block 314. If rate-card discounts are not available, however, they should be applied, then the system proceeds to block 108 (entry point M) and returns to the main menu routine 39. At block 314, the user enters the rate-card discounts and, at block 316, the media plan file is stored in storage. Thereafter, the system proceeds to block 317 (entry point D).

Figure 15:
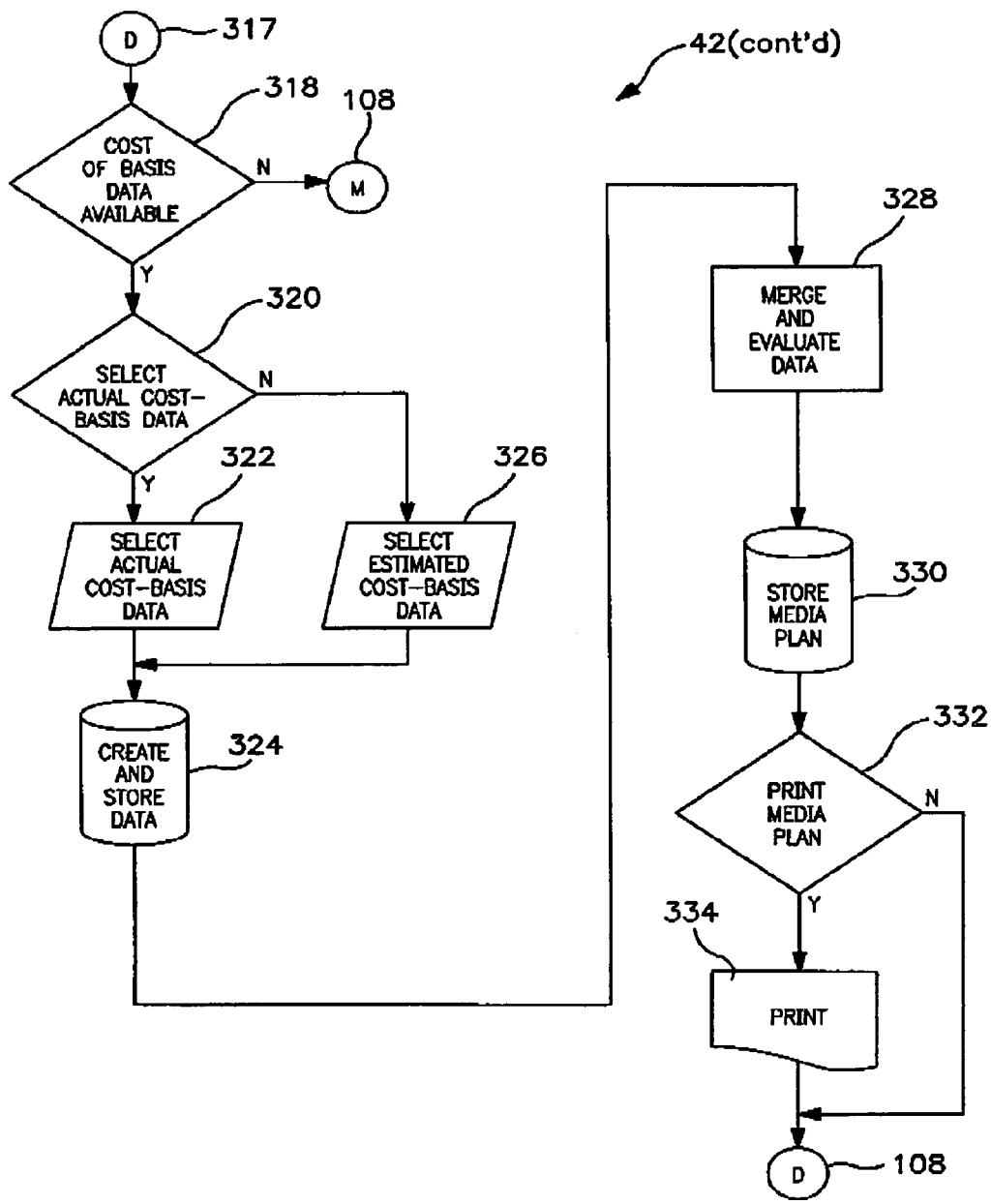
FIG. 15 is a continuation of the flow chart illustrated in FIG. 14.

Referring to FIG. 15, at block 317 (entry point D), the user proceeds to block 318. At block 318, the user is queried as to whether cost basis data for each media or media category is available. If cost basis data is available, then the system proceeds to block 320. If cost basis data is not available, then the system proceeds to block 108 (entry point M) and returns to main menu routine 39.

At block 320, the user is queried as to whether the actual cost basis data for particular media are to be selected from the media inventory (FIG. 5) and correlated with the particular media in a detailed media plan file. If actual cost basis data are to be selected, then the system proceeds to block 322. At block 322, the user selects the actual cost basis data for the particular inventory items from the media inventory (FIG. 5), for example, by using a mouse and clicking on the desired data. After the user is done selecting the actual cost basis data, the data are saved in storage at block 324. Thereafter, the system proceeds to block 328.

If, at block 320, the actual cost bases data for particular media are not to be selected from the media inventory (FIG. 5), but instead, the estimated cost bases data for general categories of media in a general media plan file are to be selected, then the system proceeds to block 326. At block 326, the user selects the estimated cost basis data for categories of inventory from the media inventory (FIG. 5), for example, by using a mouse and clicking on the desired data. After the user is done selecting the estimated cost basis data, the data are saved in storage in block 324. Thereafter, the system proceeds to block 328.

At block 328, if the media plan is a detailed media plan, the actual cost basis data selected at block 322 is merged into the detailed media plan file and evaluated to determine the actual plan cost basis and actual media cost (FIG. 6) of each media. If the media plan is a general media plan, the estimated cost basis data selected at block 326 is merged into the general media plan file and evaluated to determine the estimated plan cost basis and estimated media cost (FIG. 7) of each category of media. At block 330, the media plan file is stored in storage and the system proceeds to block 332.

At block 332, the user is queried as to whether the media plan file is to be printed. If the media plan file is to be printed, the system proceeds to block 334 and the media plan is printed for review by the user. Thereafter, the system proceeds to block 108 (entry point M) to the main menu routine 39. If, at block 332, the media plan file is not to be printed, the system proceeds directly to block 108 (entry point M) and returns to the main menu routine 39.

Figure 16:
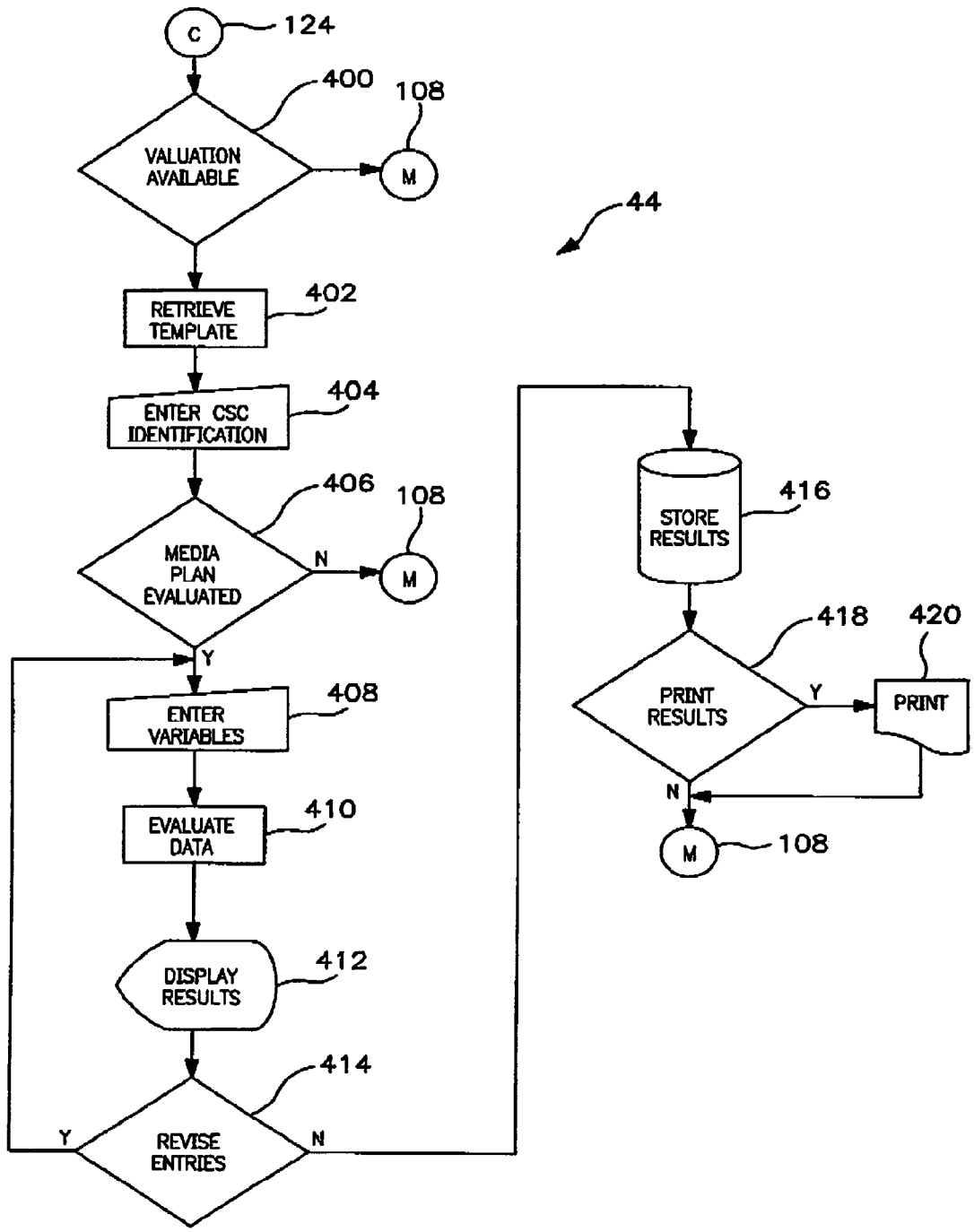
FIG. 16 is a flow chart of a software routine for cash/trade-credit blend evaluation in a data processing system of the present invention.

Referring to FIG. 16, a flow chart illustrates a cash-credit blend evaluation routine 44 in a data processing system made in accordance with an embodiment of the present invention. At block 124 (entry point C), a user enters routine 44 from main menu routine 39 and proceeds to block 400. At block 400, the user is prompted as to whether an investment decision was made based on a valuation of a company seeking capital CSC. If an investment decision was not made, the routine proceeds to block 108 (entry point M) and returns to the main menu routine 39. If an investment decision was made, the routine 44 proceeds to block 402, wherein the user retrieves a cash-credit blend evaluation template and proceeds to block 404. For example, the user retrieves a cash-credit blend evaluation template similar to the table illustrated in FIG. 9(*a*), or retrieves a cash-credit blend evaluation template similar to the table illustrated in FIG. 11. At block 404, the user identifies the retrieved template as the CSC's. Thereafter, the user proceeds to block 406.

At block 406, the user is queried as to whether a media plan has been evaluated, for example, as described above and illustrated in FIGS. 6 and 7. If a media plan has not been evaluated, the routine proceeds to block 108 (entry point M) and returns to the main menu routine 39. If a media plan has been evaluated, then the routine 44 proceeds to block 408.

At block 408, the user enters variables into the cash-credit blend evaluation template. For example, if the cash-credit blend evaluation template is the template illustrated in FIG. 9(*a*), the user enters agreed-to valuation data, desired valuation data, an investment range, and an investment range increment value. Or, for example, if the cash-credit blend evaluation template is the template illustrated in FIG. 11, the user enters a range of cash-credit ratios and a range of trade-credit portions of a cash-credit blend. Thereafter, the routine 44 proceeds to block 410. At block 410 the system evaluates the entered data and, at block 412, the results of that evaluation are displayed for the user to view. After the user has viewed the results, the routine proceeds to block 414.

At block 414, the user is queried as to whether the data entered at block 408 are to be revised. If the user desires to revise the entered data, the routine 44 returns to block 408 and proceeds as described above. If the user does not desire to revise the entered data, then, at block 416, the results are stored in storage. Thereafter, the routine proceeds to block 418.

At block 418, the user is queried as to whether the results are to be printed. If the results are to be printed, the routine 44 proceeds to block 420 and the results are printed for review by the user. Thereafter, the routine 44 proceeds to the main menu (entry point M), as shown in block 108. If the results are not to be printed, the routine 44 proceeds directly to the main menu (entry point M), as shown in block 108.

It is clear from the foregoing disclosure that the present system and method for supporting a security-trade financing service provides an alternate way for companies to obtain financing. In addition, the system and method facilitates the financing of a company holding limited assets, yet having significant growth potential. Furthermore, the system and method is easy to operate and integrate into the various technical and business methods presently available in the marketplace.

While the system and method disclosed herein have been described with respect to various specific embodiments, those skilled in the art will readily appreciate that various modifications, changes, and enhancements may be made thereto without departing from the spirit and scope of the invention as defined by the appended claims.

What is claimed is:

1. A method implemented in a computer system comprising at least one server including a storage device storing data bases, files, program routines, and a communication network, for a trading company (TC) supporting security-trade financing for facilitating growth of a capital seeking company (CSC) having deficient assets, comprising the programmed sequential steps of:
   (a) processing and/or storing data identifying inventory allocations and inventory components in an inventory of products identified by the CSC;
   (b) calculating actual or estimated total cost basis for products in the inventory based on the inventory allocations and inventory components processed or stored in step (a);
   (c) obtaining a valuation of the CSC using one of a number of accepted valuation methods;
   (d) calculating one or more cash/trade-credit blend based on the actual or estimated total plan cost basis and the valuation of the CSC obtained; and
   (e) outputting one, or more than one, cash/trade-credit blend for security-trade type financing of the CSC growth by the TC.

2. The method as recited in claim 1, wherein the inventory components are selected from the group consisting of one or more than one category of inventory products.

3. The method as recited in claim 1, further including the programmed step of storing a range of investment values and an increment value for use in calculating the cash/trade-credit blends.

4. The method as recited in claim 1, wherein the step of calculating actual or estimated total cost basis comprises discounting each inventory component by a rate-card discount.

5. A computer-implemented data processing system for supporting g security-trade financing plan by a trading company (TC) calculated for a capital seeking company (CSC) to facilitate growth while holding a limited number of deficient assets, comprising in one or more than one server:
   a storage device for a trading company storing data for identifying trade-financing inventory components and corresponding cost bases;
   a processor in communication with the storage device, wherein the processor is operative to:
   (a) store data in the storage device for identifying inventory allocations and certain inventory components desired by the deficient-asset capital-seeking company, a desired plan cost basis, and one or more than one investment value;
   (b) calculate a total plan cost basis based on the inventory allocations and the cost bases of the certain inventory components desired by the deficient asset capital-seeking company;
   (c) obtain a valuation of the CSC using one of a number of accepted valuation methods;
   (d) calculate cash/trade-credit blends based on the actual or estimated total cost; and
   (e) output the cash/trade-credit blends payable by the CSC in exchange for trade products and cash investment from the security finance trading company.

6. The data processing system as recited in claim 5, wherein the desired plan cost basis is based on valuations of the deficient asset company.

7. The data processing system as recited in claim 5, wherein the inventory components are selected from one or more than one category of inventory products and one or more than one particular inventory product.

8. The data processing system as recited in claim 7, wherein the processor is further operative to store data identifying an actual cost basis of each of the particular inventory products.

9. The data processing system as recited in claim 5, wherein the processor is further operative to store data identifying each of the categories of inventory products and data for identifying each of the particular inventory products in an inventory data base.

10. The data processing system as recited in claim 5, wherein the processor is further operative to store a range of investment values and an increment value for calculating the cash/trade-credit blends.

* * * * *